United States Patent Office 3,381,364
Patented May 7, 1968

3,381,364
PROCESS FOR OBTAINING A CLAD ARTICLE
WITH A COPPER BASE ALLOY CORE
Joseph Winter, New Haven, Conn., assignor to Olin
Mathieson Chemical Corporation, a corporation of
Virginia
No Drawing. Continuation-in-part of application Ser. No.
229,262, Oct. 2, 1962. This application May 7, 1965,
Ser. No. 454,182
12 Claims. (Cl. 29—472.3)

This application is a continuation-in-part of United States patent application Ser. No. 229,262, filed Oct. 2, 1962, now abandoned.

The present invention relates to composite metal articles. More particularly, the present invention resides in composite metal articles having a copper core and to the processes whereby said articles are obtained.

Composite articles having a copper core and a dissimilar cladding are highly desirable commercially due to the fact that the beneficial characteristics of the core and cladding materials may be obtained in one composite article. In a single alloy frequently many properties cannot be greatly modified by alloying or themal treatments, for example, such properties as modulus of elasticity, color, density, and strength in combination with high thermal or electrical conductivity. However, by forming composites apparent properties of the cladding can be generated while retaining the bulk properties of the core material. In this manner one can often obtain greatly modified and highly desirable properties over the single alloy.

For example, copper has the advantage of high conductivity and cold formability. By forming copper composites one can retain these desirable properties while generating properties of the cladding, such as wear resistance, color, oxidation or tarnish resistance and fine finishing, i.e., surface quality.

Various uses to which composite copper articles may be put are as follows: high conductivity, high strength springs; highly efficient electrical contactors; hardware involving extensive cold forming.

However, the preparation of composite articles having a copper core presents numerous practical problems. It has been difficult to produce a satisfactory composite article having a copper core due to the tendency of the cladding material to form a layer of brittle, intermetallic compounds at the interface of the copper core and the cladding. This layer may form at moderate temperatures or at elevated temperatures. The brittle layer of intermetallic compounds which so forms may shatter readily on flexing of the composite material, thus clearly limiting the utility of the composite.

In addition, with composite materials having a copper core it is frequently difficult to obtain a well bonded composite which will withstand normally expected use.

Copper presents further and peculiar problems in the formation of composites due to the tendency of copper to oxidize at the moderate or elevated temperatures necessary for hot rolling. This oxidation will produce an interference oxide layer which inhibits bonding. Some copper oxides are particularly difficult as they form a strongly adherent, plastic layer which greatly interferes with bonding. Other oxides, on the other hand, tend to break up on hot rolling, for example, aluminum oxides and iron oxides, thus not forming an inteference layer.

The tendency of copper to form this peculiar oxide has necessitated special and expensive treatment conditions in order to form copper composites.

One method of forming copper composites in order to overcome these difficulties is to form a partial bond by cold rolling followed by subsequent diffusion anneals. This is an expensive process and the diffusion anneals tend to degrade the properties of the composite.

Accordingly, it is a principal object of the present invention to provide new and improved composite articles having a copper core.

It is a further object of the present invention to provide convenient and expeditious processes whereby said composite articles are obtained.

It is a further object of the present invention to provide processes and articles as aforesaid whereby the articles are characterized by having high strengths, excellent physical properties and a wide variety of uses.

It is a still further object of the present invention to provide processes and articles as aforesaid which overcome the numerous limitations and disadvantages attendant upon the formation of conventional composite articles having a copper core.

Still further objects and advantages of the present invention will appear from the ensuing discussion.

In accordance with the present invention, it has now been found that the foregoing objects and advantages may be readily obtained. The process of the present invention readily overcomes the disadvantages of the art and achieves a simple and convenient process for obtaining a highly useful composite article clad on either one side or both sides and having a core of a copper base alloy clad with a dissimilar metal and preferably a material selected from the group consisting of a dissimilar copper base alloy, an iron base alloy, a lead base alloy, a silver base alloy, a nickel base alloy, a zinc base alloy, a tin base alloy and an aluminum base alloy. The process of the present invention comprises: (A) providing said core in plate form in a thickness less than ½ inch; (B) providing said cladding in plate form in a thickness less than ¼ inch; (C) heating said core to a temperature between 300 and 1000° F.; (D) rolling together said core and cladding at a speed of at least 100 feet per minute in one pass at a reduction between 40 and 80%, with said core and cladding coming together for the first time in the bite of the rolls, said cladding contacting the roll prior to contacting said core, with the included angle between core and cladding upon entering the rolls being in excess of 5 degrees.

It is preferred to provide an angle between the cladding and core in excess of 10° upon entering the rolls in order to insure that the cladding and core will not come together earlier than in the bite of the rolls. Generally, the included angle between the core and cladding is between 5° and 22°.

It has been found that poor results are obtained if there is no included angle between core and cladding upon entering the rolls or if pre-contact between core and cladding is had prior to the bite of the rolls.

In accordance with the present invention the cladding metal contacts the roll prior to contacting the core. On the front side of the rolls (entering side) the cladding and the rolls are travelling at different linear speeds; whereas, at the exit side they are going at the same speed due to the reduction in thickness of the composite. The difference in travelling speeds between the cladding and the rolls coupled with the pre-contact between the cladding and the rolls generates a shearing strain between the cladding and the rolls and introduces shearing at the bite of the rolls to the core-clad interface. This shearing strain at the core-clad interface results in turbulent flow of metal at the interface which causes more intimate bonding by increasing the interfacial linear surface of the composite by 20% or more.

It has been found that the simple process delineated above achieves a highly advantageous composite article, with the interface between the core and cladding characterized by the absence of atomic interdiffusion between base metal and cladding, with said interface being further characterized by having at least 20% greater surface contact area than planar sheets.

The composite articles of the present invention are characterized by excellent physical properties, very high bond strengths and the absence of atomic interdiffusion between base metal and cladding, which interdiffusion may result in the formation of brittle compounds. The present invention achieves these surprising advantages by means of a simple and convenient process and without the use of expensive devices such as are frequently employed in the art.

In accordance with the present invention any copper base alloy may be employed as the core material, i.e., any alloy containing a major proportion of copper. Typical alloys which may be employed include but are not limited to the following: high purity copper, tough pitch copper, OFHC (oxygen free high conductivity) and conventional brasses and bronzes. Typical alloying substituents include but are not limited to the following: aluminum, iron, silicon, lead, phosphorus, silver, gold, platinum, palladium, tin, nickel, zirconium and zinc.

The copper base alloy core material should be provided in plate form having a thickness less than ½ inch, i.e., the core material may be provided in strip, sheet or the like form.

It is preferred, but not required, in accordance with the present invention to mechanically roughen the bonding surfaces of both the core and the cladding materials in order to assure good surface contact at the bite of the rolls. For example, the surfaces may be wire brushed or abraded, etc.

The cladding material may be any of the cladding materials indicated hereinabove. The cladding may be, for example, any of the foregoing copper base alloys, providing that the cladding material is dissimilar to the core material. By dissimilar copper alloy or dissimilar metal, the present invention contemplates, inter alia, both a copper alloy having different alloying ingredients or the same alloy with different physical characteristics, e.g., grain size. In fact, the optimum cladding material is a dissimilar copper alloy.

In addition, any lead, tin, nickel, zinc, iron, silver or aluminum alloy may preferably be employed as the cladding material. High purity tin, lead, nickel, zinc, iron, silver or aluminum or base alloys of these materials may be readily employed.

Typical alloying substituents which may be employed include, but are not limited to, the following: with lead one may alloy tin, arsenic and cadmium; with tin one may alloy arsenic, cadmium, copper, lead and antimony; with nickel one may alloy chromium, iron, copper, titanium, aluminum, vanadium, tungsten, and cobalt; with zinc one may alloy copper, iron, aluminum and magnesium; with iron one may alloy carbon, nickel, chromium and manganese; with silver one may alloy copper and nickel; with aluminum one may alloy magnesium, copper, zinc, manganese, silicon, iron and chromium.

The cladding material should be in plate form less than ¼ inch in thickness, i.e., the cladding and the core material should be in wrought form, for example, coils of strip, sheet, etc. Therefore, the resultant composite has a thickness less than 0.60 inch where the copper is clad on two sides and less than 0.42 inch where it is clad on one side. The lowest gage materials, both core and cladding, which can be conveniently worked with, is on the order of 0.001 inch.

The starting materials, both core and cladding, can be in any temper or condition, hard or soft. Surface oxides are generally no handicap to the process of the present invention. This is quite surprising and is a significant advantage of the present invention since conventional processing must remove surface oxides prior to the formation of the composite. In fact, conventional processing frequently forms composites in special atmospheres so that one cannot form surface oxides prior to the formation of the composite. These special precautions are not required in the present invention.

It is, however, highly desirable to remove dirt or adhering lubricant from the surface of the metal prior to the process of the present invention in order to assure good contact between the core and the cladding materials. Any conventional cleaning processes may be readily employed, for example, the core and cladding materials may be passed through a soap or a detergent solution in accordance with conventional procedures. Examples of such cleaning procedures include the use of commercial alkaline cleaners and solvent cleaners, such as carbon tetrachloride and trichloroethylene.

The core material is then heated to a temperature between 300 and 1000° F., and preferably to a temperature in excess of 500° F. It is important to note that the cladding material is not heated but is left in the cold form.

The rolling step of the present invention is particularly critical. The core and cladding materials enter the rolls with the core material being provided at a temperature between 300 and 1000° F. and preferably in excess of 500° F. The core and cladding enter the rolls at an angle so that they come together for the first time in the bite of the rolls. The materials are rolled at a high speed of at least 100 feet per minute, in one pass, with a reduction between 40 and 80% and preferably between 50 and 80%. It is preferred that the core and cladding enter the rolls at an angle in excess of 10° and generally at an included angle of between 5° and 22° in order to assure that the core and cladding will not come together earlier than at the bite of the rolls and in order to put as much shear as possible at the interface. The shear at the interface enables the provision of at least 20% increased surface area than between the planar materials, i.e., the interface between the core and cladding is characterized by a wave-like formation with a significant increased interfacial contact area. It is further noted that the interfacial surface between the core and cladding is characterized by the absence of interatomic diffusion between the core and cladding material. For example, when an aluminum alloy cladding is used, there is substantially no diffusion of aluminum atoms into the copper core.

Further in accordance with the present invention the cladding metal contacts the roll before contacting the core metal. This is true whether the core is to be clad on one side or both sides.

Naturally, the present invention contemplates cladding the copper core on both sides with dissimilar metals on each side.

A further advantage of the present invention is that subsequent to the rolling operation the composites of the present invention do not require subsequent diffusion anneals, i.e., conventional processing frequently requires diffusion anneals to secure the bond between core and cladding. The fact that the present invention does not require diffusion anneals is particularly significant since diffusion anneals might and frequently do cause blisters or the like due to the long treatment times required and co-diffusion of gases to the interface between the core and cladding.

In fact, subsequent to the rolling operation no further operations whatever are required. The composites of the present invention are provided in commercial form ready to be used for the desired application. It may naturally be desirable to perform conventional subsequent operations for particular applications. For example, short thermal treatments for stress relief or the attainment of desired properties, e.g., a short heat treating anneal or aging treatment, a rolling operation for dimensional control, additional work hardening, and so forth.

The present invention will be more readily understandable from a consideration of the following illustrative examples.

Example I

In the following example the core material was a commercial purity copper alloy containing 99.9% copper in strip form having a gage of 0.075" and the cladding material was a copper base alloy containing about 75% copper and 25% nickel at a gage of 0.030". All of the processing of these materials was conducted in air. Both the core and cladding were cleaned in an alkaline detergent solution, rinsed with warm water, dried with warm dry air and the surfaces of the core and cladding abraded with a rotating wire brush. After the cleaning and abrading steps the core material was placed in a furnace and heated to a temperature of 750° F. The core and cladding were then rolled immediately after the core exited from the furnace with the cladding material being rolled cold and with the core being clad on one side only. The speed of the rolls was 150 feet per minute, the materials were rolled in one pass at a reduction of 70% and the included angle between the core and the cladding was 18°, with the core and cladding coming together for the first time in the bite of the rolls and with the cladding material contacting the roll prior to contacting the core.

The resultant composite was 0.031 inch thick, strongly bonded and the characteristics were as follows: (1) microscopic examination showed that there was no interatomic diffusion between the cladding and base materials, (2) microscopic examination showed that there was at least 25% greater bonding area at the interface than with planar materials with the interface being characterized by a wave-like formation. The gage of the cladding after rolling was 0.009–0.0010 inch, whereas the gage of the core was 0.021 to 0.022 inch.

Example II

The procedure of Example I was repeated except that the core was clad on both sides, i.e., with a second clad layer of the same cladding material of the same gage as in Example I. The included angle between claddings was 36° with the core bisecting this.

The potential assembly thickness before rolling was 0.135 inch and the resultant composite was 0.040 inch thick.

The characteristics and gage relationships of the composite were substantially as in Example I, except that the core was clad on both sides.

Example III

Example I was repeated except that the total reduction was only 30%. Upon exit from the rolls the intended core and cladding came out as two separate materials exhibiting absolutely no bonding.

Example IV

Example I was repeated except that the core and cladding materials came together prior to the bite of the rolls, thereby eliminating angulation into the rolls and eliminating pre-contact between the roll and cladding surfaces.

A single composite emerged from the rolls; however, the bond strength was quite weak and the core and cladding materials could readily be separated by hand.

Example V

Example I was repeated except that the core was 0.040 inch gage (upon entering the rolls) commercial cartridge brass having 70% copper and 30% zinc and two separate composites were formed. One clad with 0.010 inch gage (upon entering the rolls) commercial gilding metal having about 90% copper and 10% zinc, and the other composite was clad with the same thickness commercial purity (99.9%) copper.

The procedure of Example I was repeated with both of these composites except that the reduction was 70–75%.

The characteristics of the resulting composites were substantially as in Example I.

Example VI

Example I was repeated except that the core was the same material as in Example V in the same gage and two separate composites were formed, both of which utilizing low melting claddings. Both cladding materials were 0.010 inch gage before entering the rolls and one was commercial soft solder containing 60% tin and 40% lead, while the other was a copper base alloy containing 3½–4½% tin and 3½–4½% lead.

The procedure of Example I was repeated except that for both composites the core was heated to only 300° F.

The characteristics of both composites were substantially as in Example I.

Example VII

Example I was repeated with the same core material in the same gage as in Example I and with a different cladding material. The cladding material was 0.010 inch gage (upon entering the rolls) commercial purity 1100 aluminum alloy.

The procedure in Example I was repeated except that the reduction was 65 to 70%.

The characteristics of the resultant composite were substantially as in Example I.

Example VIII

Example I was repeated with the same core material in the same gage as in Example I and with a different cladding material. The cladding material was 0.020 inch gage (upon entering the rolls) C1010 grade mild steel.

The procedure of Example I was repeated except that the reduction was 60–65%.

The characteristics of the resultant composite were substantially as in Example I.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for obtaining a composite article having a core of a copper base alloy clad with a dissimilar metal which comprises:
   (A) providing said core in plate form in a thickness less than ½ inch;
   (B) providing said cladding in plate form in a thickness less than ¼ inch;
   (C) heating said core to a temperature between 300 and 1000° F.;
   (D) rolling together said core and cladding at a speed of at least 100 feet per minute in one pass at a reduction between 40 and 80%, with said core and cladding coming together for the first time in the bite of the rolls, said cladding contacting the roll prior to contacting the core, with the included angle between core and cladding upon entering the rolls being in excess of 5 degrees,
thereby forming an integrated composite article.

2. A process for obtaining a composite article having a core of a copper base alloy clad with a material selected from the group consisting of a dissimilar copper base alloy, an iron base alloy, a lead base alloy, a silver base alloy, a nickel base alloy, a zinc base alloy, a tin base alloy and an aluminum base alloy which comprises:
   (A) providing said core in plate form in a thickness less than ½ inch;
   (B) providing said cladding in plate form in a thickness less than ¼ inch;
   (C) heating said core to a temperature between 300 and 1000° F.;
   (D) rolling together said core and cladding at a speed of at least 100 feet per minute in one pass at a reduction between 40 and 80%, with said core and cladding coming together for the first time in the bite of the rolls, said cladding contacting the roll prior to contacting the core, with the included angle between core and cladding upon entering the rolls being between 5 and 22 degrees,
thereby forming an integrated composite article.

3. A process according to claim 2 wherein said included angle is in excess of 10°.

4. A process according to claim 2 wherein said core is heated to a temperature between 500 and 1000° F.

5. A process according to claim 2 wherein said core and cladding are rolled together in one pass at a reduction between 50 and 80%.

6. A process according to claim 2 wherein said cladding is a dissimilar copper base alloy.

7. A process according to claim 2 wherein said cladding is an iron base alloy.

8. A process according to claim 2 wherein said cladding is a tin base alloy.

9. A process according to claim 2 wherein said cladding is an aluminum base alloy.

10. A process according to claim 2 wherein the surfaces of said core and cladding to be bonded are mechanically roughened prior to rolling.

11. A process according to claim 2 wherein said core is clad on both sides.

12. A process according to claim 2 wherein both said core and cladding are cleaned prior to rolling.

References Cited
UNITED STATES PATENTS

| | | | |
|---|---|---|---|
| 2,707,323 | 5/1955 | Watson | 29—497.5 X |
| 2,744,314 | 5/1956 | Kinney | 29—497.5 X |
| 2,753,623 | 7/1956 | Boessenkool | 29—497.5 |
| 2,860,409 | 11/1958 | Boessenkool | 29—498 X |
| 2,908,073 | 10/1959 | Dulin | 29—497.5 X |
| 3,113,376 | 12/1963 | Pflumm | 29—471.1 |
| 3,165,828 | 1/1965 | Kennedy | 29—487 |
| 3,165,829 | 1/1965 | Wardlaw | 29—497 |
| 3,167,858 | 2/1965 | Knapp | 29—487 |
| 3,173,202 | 3/1965 | Farber | 29—487 |

JOHN F. CAMPBELL, *Primary Examiner.*

R. F. DROPKIN, *Assistant Examiner.*